Patented Jan. 29, 1946

2,393,752

UNITED STATES PATENT OFFICE 2,393,752

REACTION PRODUCTS OF DIMETHYLOL UREA AND A HALOGENATED ACETAMIDE

Gaetano F. D'Alelio, Pittsfield, Mass., assignor to General Electric Company, a corporation of New York No Drawing. Application February 14, 1941, Serial No. 378,934

13 Claims. (Cl. 260—70)

This invention relates to the production of new and useful synthetic compositions. More particularly the invention is concerned with novel synthetic resins obtained by reaction of ingredients comprising preformed dimethylol urea and a halogenated acetamide, e. g., mono-, di- and trichloracetamides, mono-, di- and tri-bromacetamides, etc.

This application is a continuation-in-part of my copending applications Serial Nos. 371,393, 371,394, now Patents, 2,328,424 and 2,328,425, respectively, both of which issued August 31, 1943, and Serial No. 371,395, now Patent 2,377,761, issued June 5, 1945, all of which applications were filed December 23, 1940, and are assigned to the same assignee as the present invention.

The preparation of resinous materials by effecting reaction between urea, thiourea or a substituted urea or thiourea containing at least one reactive —NH, =NH or —NH₂ grouping and an aldehyde, e. g., formaldehyde, has been known for many years. Such resins and articles produced therefrom are now being made and used extensively. However, their field of utility has been limited, for one reason because the resistance to water and humidity changes of the ordinary cured resins and molded products has not been entirely satisfactory for many commercial applications. It also has been suggested that resinous compositions might be produced by appropriate heat treatment of preformed dimethylol urea. However, to the best of my knowledge and belief no resins produced by mere heat treatment of preformed dimethylol urea have had the properties necessary to render them of any commercial value. The suggestion also has been made that acetamide be incorporated into a urea-formaldehyde resinous condensation product in order to plasticize the resin. Such plasticized resins and molding compositions made therefrom require the addition of a direct (active) or a latent curing catalyst in order to accelerate their conversion to an insoluble and infusible state and to render them practically useful in the plastics art.

In my above-identified copending applications I showed that resinous products having particularly valuable properties could be produced by effecting reaction between an aminotriazine, e. g., melamine, and a preformed poly-(N-carbinol) derivative of a urea, e. g., preformed dimethylol urea (Serial No. 371,393, now Patent 2,328,424); also, by effecting reaction between a preformed poly-(N-carbinol) derivative of a urea and a preformed mono- or poly-(N-carbinol) derivative of an aminotriazine, e. g., the methylol melamines (Serial No. 371,394, now Patent 2,328,425); also, by effecting reaction between a urea and a preformed poly-(N-carbinol) derivative of a urea. I further disclosed in the above-identified copending applications that various curing reactants, including halogenated acetamides, specifically mono-, di- and tri-chloracetamides, when intercondensed with the above partial reaction products, caused the potentially reactive resinous syrup rapidly to convert to an insoluble, infusible state when subjected to an elevated temperature, e. g., 100° to 200° C.

The present invention is based on my discovery that novel synthetic resins of particular value in the plastics and coating arts can be prepared by effecting reaction between ingredients comprising essentially preformed dimethylol urea and a halogenated acetamide. The reaction may be carried out under acid, neutral or alkaline conditions, at normal or at elevated temperatures, at atmospheric, sub-atmospheric or super-atmospheric pressures, and in the presence or absence of solvents, diluents, fillers, plasticizers, other natural or synthetic resins or resin-forming materials. These new resins are characterized by their high resistance to water in cured state as compared with the ordinary, cured urea-formaldehyde resins. Furthermore, the heat-convertible resinous syrups and molding compounds prepared therefrom have excellent time- or storage-stability, that is, they can be stored for long periods of time without materially advancing toward the insoluble, infusible state. Also, at temperatures of the order of 100° to 180° C. the resins and molding compounds of this invention convert rapidly to the insoluble and infusible or cured state without the addition of direct or active curing catalysts or of latent curing accelerators. This was quite surprising and unexpected, since resinous reaction products of preformed dimethylol urea and acetamide show no accelerated curing characteristics when heated at 100° to 180° C.

In order that those skilled in the art better may understand how the present invention may be carried into effect, the following illustrative examples thereof are given. All parts are by weight.

Example 1

| | Parts |
|---|---|
| Preformed dimethylol urea | 120.0 |
| Chloracetamide (monochloracetamide) | 1.5 |
| Water | 120.0 |

The preformed dimethylol urea was dissolved in the water and the resulting solution was heated under reflux at the boiling temperature of the mass for 30 minutes. Then the chloracetamide was added and reaction between the chloracetamide and the dimethylol urea was effected by heating the components together under reflux for 15 minutes. A heat-hardenable resinous syrup was obtained. When a small sample of this syrup was heated on a 140° C. hot plate, it cured rapidly to an insoluble, infusible state.

A molding (moldable) compound was made by mixing the syrup produced as described above with 70 parts alpha cellulose in flock form and 0.4 part of a mold lubricant, specifically zinc stearate. The wet compound was dried at 64° C. for two hours. The dried compound was molded for 5 minutes at 130° C. under a pressure of 2,000 pounds per square inch. The molded piece was well cured throughout and had good water resistance.

Example 2

A resin was prepared as described under Example 1 with the exception that 2 parts dichloracetamide were used instead of 1.5 parts monochloracetamide. The resin syrup, when tested on a 140° C. hot plate, cured somewhat more slowly to the insoluble, infusible state than the corresponding product of Example 1.

A molding compound was made as in Example 1. The wet compound was dried at 64° C. for 2½ hours. Molding the dried compound for 7 minutes at 130° C. and 2,000 pounds per square inch pressure yielded a well-cured molded piece. The compound showed good flow characteristics during molding.

Example 3

The same procedure was followed in making a resin syrup as set forth under Example 1 with the exception that 2 parts trichloracetamide were used in place of 1.5 parts monochloracetamide. This syrup also converted to a hard, infusible resin when a small sample was tested on a 140° C. hot plate.

A molding compound, prepared as described under Example 1, was dried at 64° C. for 2¼ hours. A well-cured molded article that showed good plastic flow during molding was obtained by molding the dried compound for 7 minutes at 130° C. under 2,000 pounds per square inch pressure.

Example 4

| | Parts |
|---|---|
| Preformed dimethylol urea | 120.0 |
| Dichloracetamide | 2.0 |
| Aqueous ammonia (28% $NH_3$) | 6.0 |
| Water | 120.0 |

The dimethylol urea, ammonia and water were heated together under reflux at the boiling temperature of the mass for 30 minutes. The dichloracetamide was now added and the ammonical solution was heated under reflux for an additional 15 minutes to effect reaction between the preformed dimethylol urea and the dichloracetamide. The resulting syrup cured to an insoluble and infusible resin when a small sample of it was heated on a 140° C. hot plate.

A molding compound was made as described under Example 1. The wet compound was dried at 64° C. for 1¼ hrs.. The dried compound was molded at 130° C. under a pressure of 2,000 pounds per square inch for 5 minutes. A well-cured molded piece was obtained. The molding compound prepared from the resinous syrup of this example exhibited more rapid curing characteristics than the syrup of Example 2.

Example 5

| | Parts |
|---|---|
| Preformed dimethylol urea | 120.0 |
| Monochloracetamide | 1.0 |
| Aqueous ammonia (28% $NH_3$) | 6.0 |
| Sodium hydroxide in 5 parts water | 0.1 |
| Water | 120.0 |

All of the above components with the exception of the monochloracetamide were heated together under reflux at the boiling temperature of the mass for 30 minutes. The monochloracetamide was now added and heating under reflux was continued for 15 minutes. Testing of a small sample of the resulting syrup on a 140° C. hot plate showed that it cured readily to an insoluble, infusible state.

A molding composition, made as described under Example 1, was dried at 64° C. for 1 hour. Molding the dried compound for 5 minutes at 130° C. and 2,000 pounds per square inch pressure yielded a well-cured molded piece of good appearance.

Example 6

| | Parts |
|---|---|
| Preformed dimethylol urea | 120.0 |
| Melamine | 42.0 |
| Aqueous ammonia (28% $NH_3$) | 6.0 |
| Sodium hydroxide in 5 parts water | 0.1 |
| Monochloracetamide | 1.5 |
| Water | 160.0 |

All of the above components with the exception of the monochloracetamide were heated together under reflux at boiling temperature for 30 minutes, after which the monochloracetamide was added and refluxing was continued for an additional 5 minutes. A small sample of the syrup was tested for its curing characteristics by heating it on a 140° C. hot plate. It converted rapidly to a hard, infusible resin.

A molding compound was made from this syrup as described under Example 1. The wet compound was dried for 2 hours at 64° C. A well-cured molded piece of good water resistance was obtained by molding the dried compound for 3 minutes at 130° C. under a pressure of 2,000 pounds per square inch.

Example 7

The same formula and procedure were followed in making a resin syrup as described under Example 6 with the exception that 2 parts trichloracetamide were used instead of 1.5 parts monochloracetamide. When a small sample of the syrup was tested on a 140° C. hot plate, it cured readily to an insoluble, infusible resin.

A molding composition, prepared as described under Example 1, was dried at 64° C. for 2¼ hours. Molding the dried compound for 5 minutes at 130° C. under a pressure of 2,000 pounds per square inch yielded a well-cured molded article of high resistance to water and of good surface appearance.

It will be understood, of course, by those skilled in the art that my invention is not limited to the specific components named in the above illustrative examples. Thus, instead of using monochloracetamide ($ClCH_2CONH_2$), dichloracetamide ($Cl_2CHCONH_2$) or trichloracetamide

alone or mixed with one another, I may use any other halogenated acetamide, or mixture thereof, e. g., monobromacetamide, dibromacetamide, tribromacetamide, mixtures of brominated acetamides, mixtures of chlorinated and brominated acetamides, etc. The choice of the halogenated acetamide is dependent largely upon economic considerations and the particular properties desired in the final product. For example, when light-colored molded articles are desired the use of the iodo derivatives should be avoided; and when the resinous reaction product is to be used in the production of molding compositions, the fluorinated acetamides preferably are not employed. I prefer to effect reaction between ingredients comprising, by weight, a preponderant proportion of preformed dimethylol urea and a minor proportion of a chlorinated acetamide or of a mixture of chlorinated acetamides.

If a condensation catalyst is used to accelerate the condensation reaction between the components, I prefer to use an alkaline or basic condensing agent. Condensation products having excellent storage-stability characteristics can be obtained by causing the condensation reaction to take place in the presence of a condensation catalyst comprising a primary condensation catalyst and a secondary condensation catalyst. As the primary catalyst there advantageously may be used a nitrogen-containing basic compound, e. g., ammonia, primary amines (e. g., ethyl amine, propyl amine, etc.), secondary amines (e. g., dipropyl amine, dibutyl amine, etc.) and tertiary amines such as trialkyl (e. g., trimethyl, triethyl, etc.) amines, triaryl (e. g., triphenyl, etc.) amines, etc. The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.). Thus, resinous products of exceptional storage stability may be obtained by causing ingredients comprising essentially preformed dimethylol urea and a halogenated acetamide, specifically a chlorinated acetamide, to react in the presence of a condensation catalyst comprising a relatively small amount of ammonia and a lesser but substantial amount of a fixed alkali, for example sodium or potassium hydroxide.

In producing my new compositions of matter comprising a reaction product of ingredients comprising preformed dimethylol urea and a halogenated acetamide, the ratio between the components may be varied as desired or as conditions may require. Usually the halogenated acetamide is used in an amount ranging from 0.001 to 0.25 mol of the halogenated amide for each mol of preformed dimethylol urea. The use of a higher ratio of halogenated acetamide to preformed dimethylol urea is not precluded, but no particular advantage ordinarily accrues from using more halogenated acetamide than required to impart the desired curing characteristics to the heat-convertible resin.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; mono- and poly-amides, e. g., formamide, acetamide, stearamide, acryloamide, benzamide, toluene sulfonamide, benzene disulfonamide, benzene trisulfonamide, malonic diamide, itaconic diamide, fumaric diamide, maleic diamide, adipic diamide, phthalamide, urea, thiourea, selenourea, iminourea, substituted ureas, thioureas, selenoureas and iminoureas, numerous examples of which are given in various copending applications of mine, for example in my copending application Serial No. 371,395, now Patent 2,377,761; aminotriazines (amidogentriazines), e. g., melamine, ammeline, ammelide, numerous other examples of which are given in various copending applications of mine, for instance in my copending application Serial No. 371,393, now Patent 2,328,424; methylol derivatives of, for example, aminotriazines, monoamides, polyamides other than urea, etc., e. g., the methylol melamines including trimethylol melamine; amines, e. g., ethylene diamine, aniline, phenylene diamine, etc.; phenols, including aminophenols, etc.; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, urea-aldehyde resinous condensation products (e. g., a resinous reaction product of urea and formaldehyde), resinous condensation products of an active methylene-containing body, e. g., an aldehyde such as formaldehyde, with an aminodiazole or an aminotriazine, phenol-aldehyde condensation products, furfural condensation products, modified or unmodified, saturated or unsaturated polyhydric alcohol-polycarboxylic acid condensation products, sulfonamide-aldehyde resins, water-soluble cellulose derivatives, natural gums and resins such as shellac, rosin, etc.; polyvinyl compounds such as polyvinyl alcohol, polyvinyl esters, e. g., polyvinyl acetate, etc., polyvinyl ethers, including the polyvinyl acetals, e. g., polyvinyl formal, etc., polyvinyl ketones, etc.

Dyes, pigments, plasticizers, mold lubricants, opacifiers and various fillers (e. g., wood flour, glass fibers, asbestos, including refibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a wide variety of shapes under heat or under heat and pressure, more particularly at temperatures of the order of 100° to 180° C. For optimum results I prefer to use temperatures ranging from approximately 110° to 150° C. Molding pressures may be varied considerably, but usually are within the range of 1,000 to 10,000 pounds per square inch, more particularly from 2,000 to 4,000 or 5,000 pounds per square inch.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, and for binding or cementing together mica flakes to make a laminated mica article. They are particularly useful as fire retardants and sizings for cotton, linen and other cellulosic materials. They also may be used as impregnants for electrical coils. The cured products have excellent resistance to heat and water and have a high dielectric strength.

What I claim as new and desire to secure by Letters Patent of the United States is:

1. A composition comprising a product of reaction, under heat, of ingredients comprising preformed dimethylol urea and a halogenated acetamide.

2. A composition comprising an alcohol-modified product of reaction, under heat, of ingredients comprising preformed dimethylol urea and a halogenated acetamide.

3. A heat-curable composition comprising the product of reaction, under heat, of ingredients comprising preformed dimethylol urea and a chlorinated acetamide.

4. A product comprising the cured composition of claim 3.

5. A resinous composition obtained by reaction, under heat and in the presence of an alkaline substance, of ingredients comprising a chlorinated acetamide and preformed dimethylol urea in the ratio of from 0.001 to 0.25 mol of the former to 1 mol of the latter.

6. A resinous composition produced by reaction, under heat, of ingredients comprising, by weight, a preponderant proportion of preformed dimethylol urea with a minor proportion of a chlorinated acetamide while admixed with a condensation catalyst comprising ammonia and a fixed alkali.

7. A composition comprising the resinous product of reaction, under heat, of ingredients comprising preformed dimethylol urea and a mixture of chlorinated acetamides.

8. A resinous composition obtained by reaction, under heat, of ingredients comprising preformed dimethylol urea and monochloracetamide.

9. A resinous composition obtained by reaction, under heat, of ingredients comprising preformed dimethylol urea and dichloracetamide.

10. A composition comprising (1) a resinous product of reaction, under heat, of ingredients comprising preformed dimethylol urea and a chlorinated acetamide, and (2) a urea-formaldehyde resinous condensation product.

11. A heat-hardenable molding composition comprising a cellulosic filler and a heat-curable product of reaction, under heat, of ingredients comprising preformed dimethylol urea and a chlorinated acetamide.

12. An article of manufacture comprising the heat-hardened molding composition of claim 11.

13. The method of preparing new compositions of matter which comprises effecting reaction under heat between ingredients comprising preformed dimethylol urea and a halogenated acetamide.

GAETANO F. D'ALELIO.